United States Patent [19]
Roberts et al.

[11] Patent Number: 5,345,242
[45] Date of Patent: Sep. 6, 1994

[54] CLUTTER REJECTION USING CONNECTIVITY

[75] Inventors: Gregory A. Roberts, Costa Mesa; Lawrence D. Voelz; Robert C. Gardemal, Jr., both of Irvine, all of Calif.

[73] Assignee: Loral Aerospace Corp., New York, N.Y.

[21] Appl. No.: 588,776

[22] Filed: Sep. 27, 1990

[51] Int. Cl.⁵ ............................................. G01S 13/53
[52] U.S. Cl. ................................. 342/159; 364/517; 382/26
[58] Field of Search ............. 382/26, 27, 1, 41; 358/125, 126; 250/203.1, 203.2, 203.6; 342/90, 159; 364/517; 367/126; 348/169, 172

[56] References Cited

U.S. PATENT DOCUMENTS

| | | | |
|---|---|---|---|
| 4,005,415 | 1/1977 | Kossiakoff et al. | 342/90 |
| 4,223,387 | 9/1980 | Danielsson et al. | 364/515 |
| 4,489,388 | 12/1984 | DeGroot et al. | 364/517 |
| 4,593,406 | 6/1986 | Stone | 382/44 |
| 4,661,984 | 4/1987 | Bentley | 382/8 |
| 4,685,143 | 8/1987 | Choate | 382/25 |
| 4,736,439 | 4/1988 | May | 382/54 |
| 4,742,557 | 5/1988 | Ma | 382/51 |

FOREIGN PATENT DOCUMENTS 0147886 8/1985 Japan ................................. 382/1

*Primary Examiner*—Tod R. Swann
*Attorney, Agent, or Firm*—Harry G. Weissenberger; Anthony J. Karembelas

[57] ABSTRACT

In a FLIR target detection system, true targets (52) are isolated from potential false target indications produced by background clutter through the use of a connectivity algorithm which attempts to find around each potential target (52) a closed path (65) of lower (or higher) intensity without exceeding a predetermined distance from the centroid (64) of the potential target. If the attempt is successful, the potential target (52) is a true target; if not, it is clutter.

8 Claims, 4 Drawing Sheets

CLUTTER REJECTION USING CONNECTIVITY

FIELD OF THE INVENTION

This invention relates to clutter rejection in digitized images, and more particularly to a method of isolating small target objects from background clutter by using a connectivity algorithm.

BACKGROUND OF THE INVENTION

In the forward-looking infrared (FLIR) imaging of a non-uniform scene such as terrain, point targets whose temperature is substantially higher or lower than that of the background (e.g. aircraft of long range) are often not detected by the target detection algorithms conventionally used in FLIR imaging. Conventional target detection algorithms can also falsely mark many background clutter features as targets. Such target detection algorithms include leading-edge-trailing-edge detection and least-mean-squared (LMS) filtering. One-dimensional LMS filters can produce false target indications on edges of background objects, as is the case for leading-edge-trailing-edge detection, and even the use of two orthogonal one-dimensional LMS filters can still produce false target indications on corners. In order to isolate point targets for a clear display, it is necessary to determine the spatial extent and spatial connections of an object of interest in real time—a difficult computational feat.

Prior art in this field includes: U.S Pat. No. 4,742,557 to Ma, which shows a system for extracting character information from a noisy background in an optical scanner; U.S. Pat. No. 4,736,439 to May, which relates to the preprocessing of an image by median subtraction; and U.S. Pat. No. 4,685,143 to Choate, which deals with a scheme for analyzing edge spectra.

DISCLOSURE OF THE INVENTION

In accordance with the invention, the imaging electronics examine the pixel intensities of pixels forming a closed path (65) around the centroid (64) of a potential target object (52). The examining electronics require the pixels' intensities to differ in a predetermined manner from the centroid's intensity in order to be part of the path (65). If such a path can be drawn before any pixel of the path (65) exceeds a predetermined distance from the (64), the potential target object (52) is identified as a real target and can be displayed as such.

In order to make the requisite calculations feasible in real time, the invention provides an examination pattern (66) which minimizes the number of intensity comparisons necessary to determine the existence of a closed path. This is done by performing the comparisons in rectangular paths (20 through 26) and in a ray-like pattern, each ray being terminated as soon as a sufficient intensity difference is found on it.

DESCRIPTION OF THE PREFERRED EMBODIMENT

Figure 1A:
FIG. 1a is a FLIR image showing a target.

FIG. 1a shows a typical FLIR image 50. Most pixels of the display can be prescreened before the connectivity clutter rejection of this invention is accomplished. A target aircraft is shown in FIG. 1a at 52.

Figure 1C:
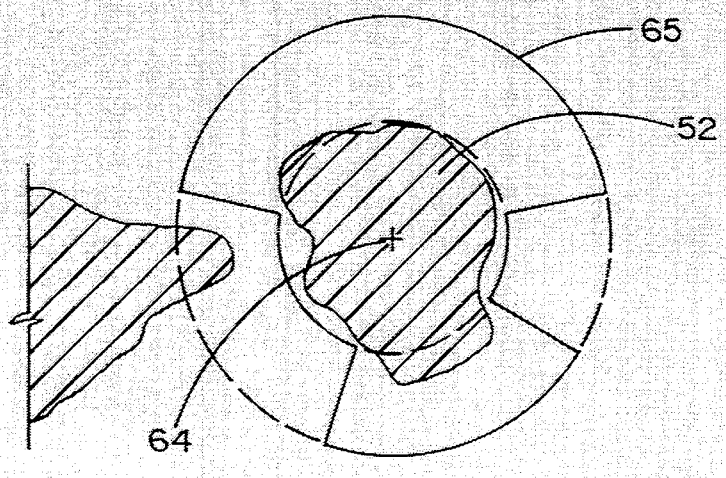
FIG. 1c is a diagram illustrating a closed path around a target object.
Figure 1B:
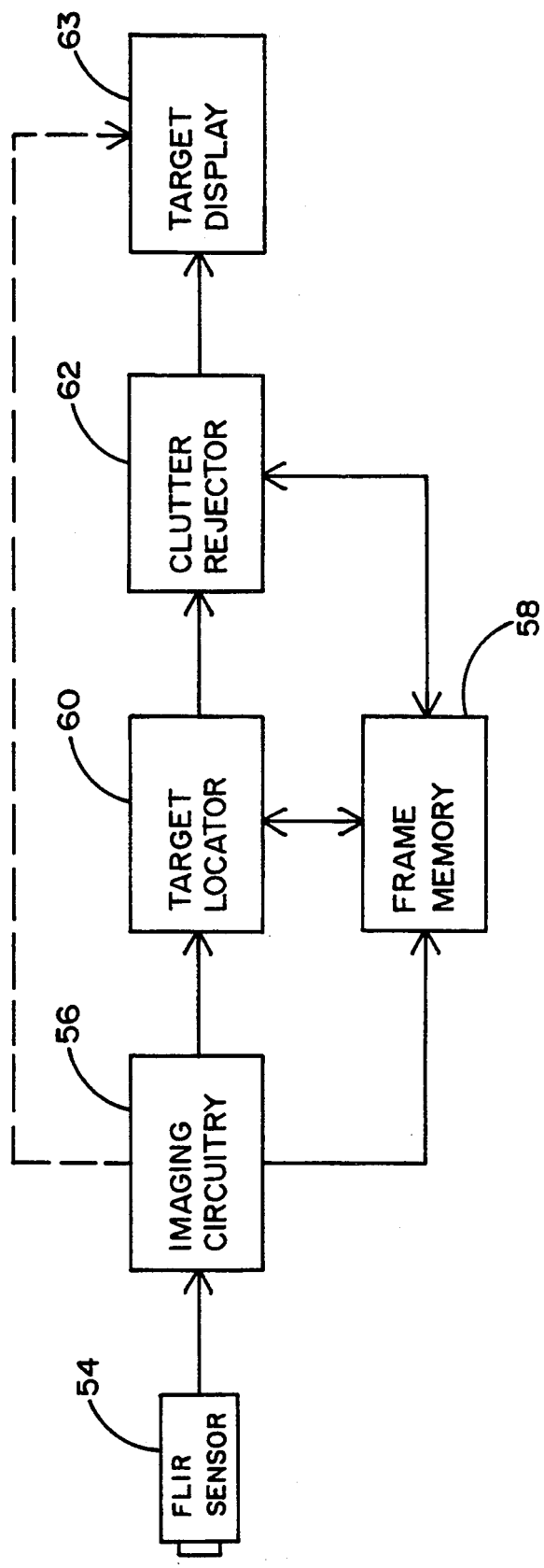
FIG. 1b is a block diagram of the environment in which the invention operates.

FIG. 1b shows, in block form, a typical FLIR target locator using the invention. The infrared image seen by the sensor 54 is digitally processed by the imaging circuitry 56 and stored, one frame at a time, in the frame memory 58.

Algorithms such as least-mean-squares (LMS) are conventionally used in the target locator 60 to prescreen the pixels and locate the centroids of objects in the image 50 which have attributes of potential targets. The nature of these algorithms is such that objects may be identified as potential targets even if they are connected to large objects or too elongated to be real targets. As a result, the processing of the image 50 for target display frequently yields false targets. This false target identification is known as clutter. Each potential target in the image 50 is then examined by the clutter rejector 62 of this invention to delete the false targets and display (in enhanced form) only true targets on the target display 63. In the system of FIG. 1b, all elements other than the clutter rejector 62 are conventional and well known.

In accordance with the invention, the centroid of a potential target 52 identified in the image 50 by a conventional target-locating algorithm. An attempt is then made to find a closed path, such as path 65 in FIG. 1c, which surrounds the centroid 64 without passing through any pixels which have the attributes of a potential target (shaded areas in FIG. 1c).

Figure 2:
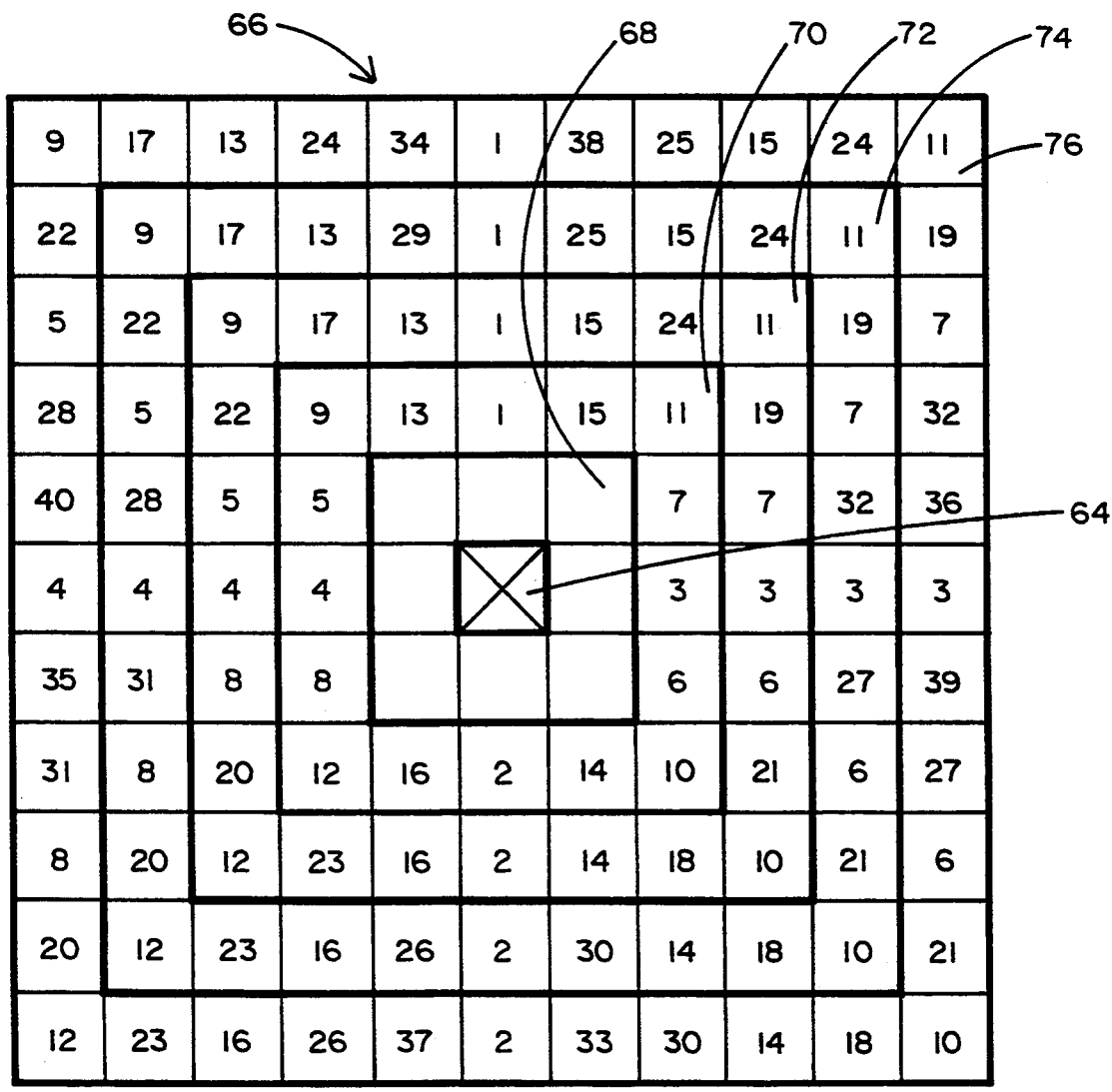
FIG. 2 is a diagram showing an example of nested pixel paths and their pixel comparison sequences.

In a digitized image such as image 50, the centroid pixel 64 can be considered to be surrounded by a series of closed nested paths of pixels which may or may not be made visible as in FIG. 1, and which are shown in more detail in FIG. 2. In that figure, the centroid pixel 64 is at the center of (as a matter of example) an eleven-by-eleven array 66 of pixels of the digitized image 50 stored in memory 58. The array 66 is formed, as shown in FIG. 2, by pixel paths 68, 70, 72, 74 and 76.

A potential target is considered to be a true target if an imaginary closed line can be drawn around the centroid 64 within a predetermined distance such that for all points in the path the pixel intensity plus a positive threshold is less than the intensity of centroid 64 (for a hot target) or the pixel intensity minus a positive threshold is greater than the intensity of centroid 64 (for a cold target). The threshold: is a sensitivity factor which is used for clutter rejection. In the preferred embodiment of FIG. 2, the invention detects the existence of such a path by examining the intensity of the pixels of the paths 70, 72, 74, 76 in that order (path 68 is not examined because, assuming the target is at least 3×3 pixels in size, it is so close to centroid 64 that it would always be assumed to form part of the target).

Figure 3:
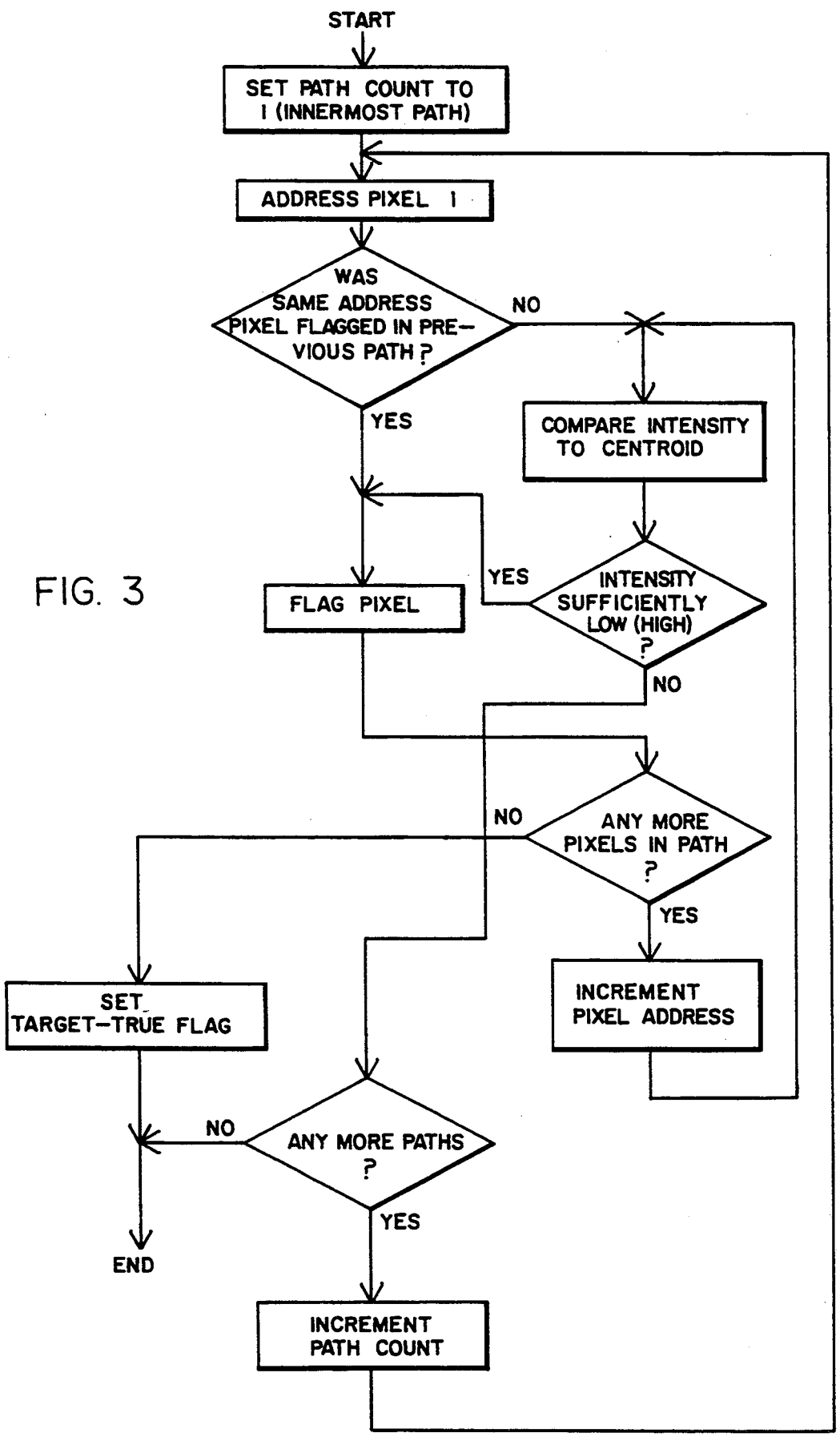
FIG. 3 is a flow chart illustrating the functioning of the invention.

In the connectivity algorithm used in the preferred embodiment of the invention, the pixels of path 70 are first examined in the numerical order indicated in FIG. 2. Whenever one of these pixels is found (in the case of a hot target) to have a greater intensity than the intensity of centroid 64 minus a positive threshold, a flag is not set in memory. Then the pixels of path 72 are examined in the numerical order shown; however, if a pixel with the same number was flagged in the preceding path (i.e. path 70), it is flagged without examination. If any path is found where all pixels are flagged then the potential target passes the test. Otherwise, the process is then repeated. with path 74 if any pixel in 72 is not flagged, and finally with: path 76 if any pixel in 74 is not flagged. A flow chart illustrating the process is shown in FIG. 3.

The examination sequence of the pixels in paths 70, 72, 74, 76 as shown in FIG. 2 is preferably so chosen that pixels with the same sequence number in successive paths form a ray-like pattern radiating out from the centroid 64, and that the sequence numbers in each path are arranged in pairs of successive numbers positioned on diametrically opposed sides of the centroid 64. This arrangement is set by examining target data and determining which arrangement has the highest statistical probability of finding a closed path, if one exists, in the shortest possible time.

If, upon completion of the examination of path 76 or of any preceding path, all pixels of the path are flagged, a closed path of lesser intensity exists within the allotted distance from the centroid 64, and the target centered on the centroid 64 is identified as true. If any unflagged pixels remain in the last path 76, the target is identified as false.

It will be understood that although four paths are examined in FIG. 2, the number of paths may be greater or smaller, and their distance from the centroid 64 varied, to accommodate the parameters of a particular imaging technique or a particular type of target. For this purpose, there is an advantage in visibly displaying the paths as shown in FIG. 1. By the same token, the paths may be spaced from one another and may be other than square without departing from the invention.

We claim:

1. A method of clutter rejection in digitized images, comprising the steps of:
   a) locating the centroid pixel of a potential target object in an image;
   b) establishing around said centroid pixel at least one closed path of pixels;
   c) comparing the intensity of the individual pixels of said path to the intensity of said centroid pixel; and
   d) providing an identification of said potential target object as true if all of said individual pixels have a predetermined intensity relationship to said centroid pixel.

2. The method of claim 1, in which a plurality of nested paths of pixels are established around said centroid pixel, and said potential target object is identified as true if all pixels of any path have said predetermined intensity relationship to said centroid pixel.

3. The method of claim 2, in which said path pixels are compared to said centroid pixel one path at a time, working outward from the innermost of said nested paths.

4. The method of claim 3, in which said path pixels are compared in a numerical sequence such that pixels having the same sequence number in successive paths form lines of pixels substantially radiating outwardly from said centroid pixel.

5. The method of claim 4, in which said sequence numbers are assigned to said path pixels in pairs, the second number of the pair being assigned to a pixel located diametrically opposite, with respect to said centroid pixel, from the pixel to which the first number of the pair is assigned.

6. A method of clutter rejection in digitized images, comprising the steps of:
   a) locating the centroid pixel of a potential target object in an image;
   b) establishing a plurality of nested closed paths of pixels around said centroid pixel;
   c) comparing the intensity of the individual pixels of said paths to the intensity of said centroid pixel one path at a time, working outward from the innermost said nested paths, said path pixels being compared in a numerical sequence such that pixels having the same sequence number in successive paths form lines of pixels substantially radiating outwardly from said centroid pixel;
   d) flagging those path pixels found upon comparison to have a predetermined intensity relationship to said centroid pixel, and flagging all pixels having the same sequence number in subsequently examined paths without comparison; and
   e) providing an identification of said potential target object as true if all pixels in one of said nested paths are flagged.

7. A method of clutter rejection in digitized images, comprising the steps of:
   a) locating the centroid pixel of a potential target object in an image;
   b) determining the existence of a closed path of pixels surrounding said centroid pixel, wherein all pixels of said path have a predetermined intensity relationship to said centroid pixel, and all pixels of said path are located at no more than a predetermined distance from said centroid pixel; and
   c) providing an identification of said potential target object as true when such a path is determined to exist.

8. The method of claim 7, in which said determining step includes:
   i) defining a plurality of nested closed pixel paths surrounding said centroid pixel;
   ii) determining the existence of said predetermined intensity relationship for successive pixels of an inner one of said paths;
   iii) for each pixel of said inner path for which said relationship does not exist, determining whether said relationship exists for a pixel located radially outwardly thereof on the outwardly next one of said closed paths;
   whereby the existence of a closed true path of pixels having said predetermined relationship may be determined even though said true path has a shape different from the shape of said nested paths.

* * * * *